May 11, 1965    I. ROSINEK    3,183,439
PORTABLE HIGH VOLTAGE TEST STICK
Filed Aug. 23, 1960    2 Sheets-Sheet 1

INVENTOR.
ISIDORE ROSINEK
BY
ATTORNEY

May 11, 1965      I. ROSINEK      3,183,439
PORTABLE HIGH VOLTAGE TEST STICK
Filed Aug. 23, 1960      2 Sheets-Sheet 2
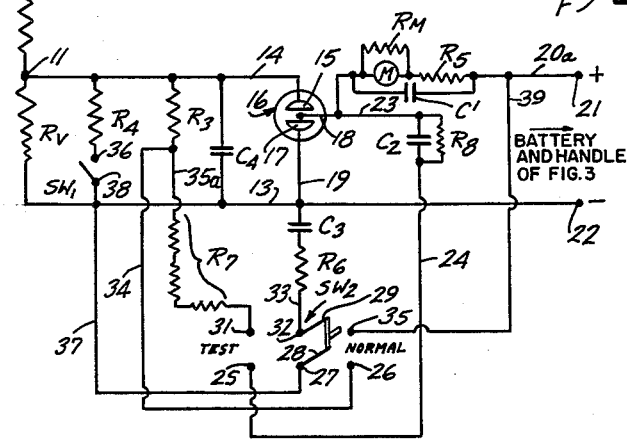
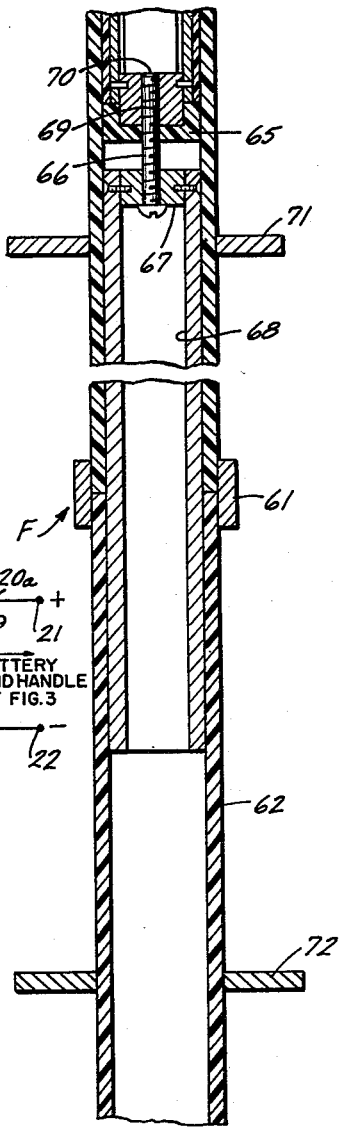
INVENTOR.
ISIDORE ROSINEK
BY
ATTORNEY

United States Patent Office 3,183,439
Patented May 11, 1965

3,183,439
PORTABLE HIGH VOLTAGE TEST STICK
Isidore Rosinek, Brooklyn, N.Y.
(1512 W. Flagler St., Miami, Fla.)
Filed Aug. 23, 1960, Ser. No. 51,411
5 Claims. (Cl. 324—122)

The present invention relates to a portable high voltage indicating device, and it particularly relates to a portable high voltage test stick.

The present invention is a continuation-in-part of the subject matter of application Serial No. 431,215, filed May 20, 1954, now Patent No. 2,988,700.

It is a particular object of the present invention to provide a portable high voltage indicating device and particularly a portable high voltage test stick which will be effective without the use of a ground and which will provide an extension handle to automatically increase sensitivity as the handle of the test stick is lengthened.

A further object of the present invention is to provide a check circuit for an ungrounded type of potential indicator in which a meter is provided as an automatic battery tester and as a high voltage indicator.

In patent application Serial No. 431,215, filed May 20, 1954, now Patent No. 2,988,700, a relay was provided and, according to a preferred embodiment of the present invention, a meter is employed in lieu of said relay so that both the meter and a light may be used as indicating devices.

A particular feature of the present invention resides in the fact that the circuit of the multi-element gas tube or thyratron is utilized, together with the indicating instrument or meter, with the control element being employed to contact the circuit to be tested.

In the preferred embodiment of the present invention the anode circuit containing the instrument, the lights and the relay all obtain their energy from a local battery source other than the circuit being tested.

It is a particular feature of the present invention that an extinguishing circuit is utilized to extinguish the thyratron after its control element has been removed from the influence of the potential being tested.

In the preferred embodiment, the extinguishing circuit consumes no stand-by energy, nor does it affect the calibration of the device.

In the preferred extinguishing circuit, a D.C. source of supply is utilized in connection with the thyratron circuit.

Furthermore in the present application, an important feature is the utilization of a circuit in which the cathode may be provided with either a resistor or condenser voltage divider, one end of which is connected to the handle portion of the stick and the other end of which is connected to the test probe and the ground connection to the stick may be omitted.

The present invention is particularly advantageous as compared to a potential detector of the neon type which operates as a capacity coupled device wherein the energy of the high voltage device is capacity coupled to the neon tube and hence to a very high resistance leakage to the ground.

Even through this device may be made sensitive to an A.C. potential with a sensitivity of approximately 2,000 volts, the device in general will not indicate the presence of a D.C. potential except when the potential is many times that of the minimum operating A.C. voltage.

Although these portable devices are provided with extension handles which are increased in length as the higher voltages are to be probed, and for a given voltage, the sensitivity greatly decreases with an increase in the handle length.

According to the present invention, a potential indicating device has been developed without ground connections, which will operate at much lower potentials than other known devices and which will also operate at D.C. potentials at the same value as other devices indicate A.C. potentials.

It is a particular feature of the present invention that the high voltage test stick or potential tester may be effectively employed without connecting the voltage divider directly to the ground.

In the preferred form, capacities are introduced into the handle to eliminate the necessity of direct ground connections.

These capacities in the extension handle furthermore will have the most desirable effect of overcoming any loss in sensitivity created by any lengthening of the handle for any given test voltage.

Furthermore, a meter is desirably incorporated in the indicating circuit so as to provide an additional indicating means and also to provide means for automatically checking the voltage condition of the anode source.

This indication may be provided by utilizing a reference mark on the meter without in any way detracting from the "live" indication of the meter.

With the application of the long handle, wherein the operator of the test stick is required to look upward for his "live" indication, the meter now is a very direct means of affording an indication of a "live" circuit in the bright light against the sky or against the source of illumination.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 2 shows the same circuit as in FIG. 1 but with an indicating meter potential indicating device.

FIG. 3 is a diagrammatic layout of a capacitor handle device.

Figure 1:
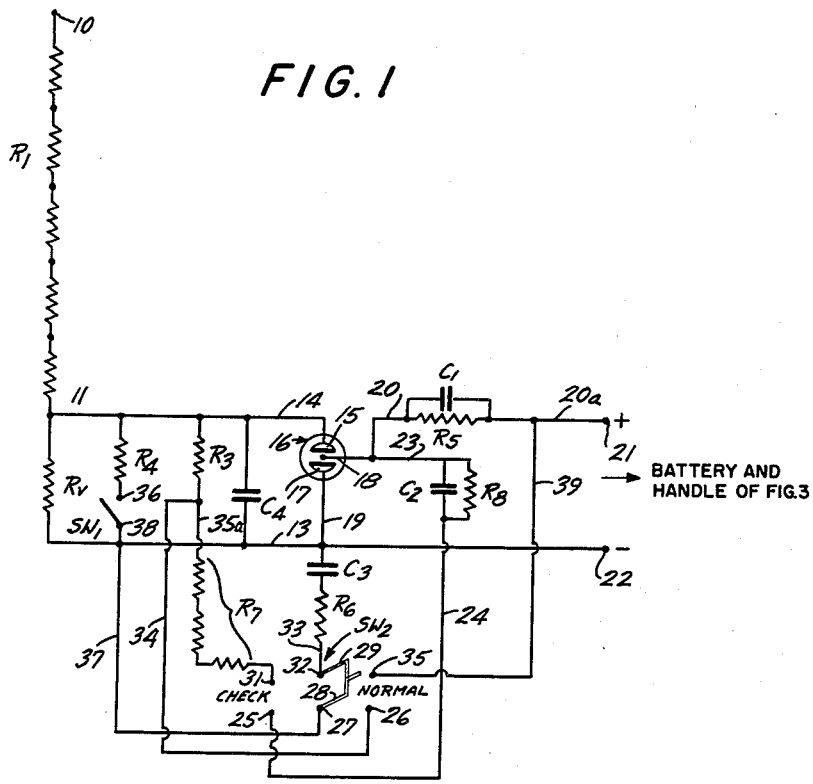
FIG. 1 is a diagrammatic layout showing the use of a test stick circuit without direct ground connection.

Referring particularly to FIG. 1, it will be noted that the circuit here is essentially as shown in the parent application, Serial No. 431,215, now Patent No. 2,988,700, except that there is no ground connected to the cathode.

In FIG. 2 of the present application, the same circuit is utilized as in FIG. 1 except that a meter has been added as an additional indicator.

Normally this meter, together with the by-pass resistance, is connected in series with the anode of the thyratron tube.

A safety by-pass resistor is used in conjunction with the meter to permit the thyratron to function should the meter become electrically or mechanically defective.

The amount of the deflection of the meter is dependent upon the D.C. voltage of the supply source, inasmuch as the resistance of the thyratron when operating its practically constant.

Since in FIG. 2 the meter is in series with the resistor of the extinguisher circuit and by-passed by a condenser, this will prevent the constantly swinging indicator needle of meter M from contacting either the lower or upper stop in its swinging movement. This external condenser serves a dual purpose, one purpose being as a by pass of the extinguishing circuit.

Because of its slow discharge, it also has the effect of dampening the meter M and preventing the pointer from banging against the stop.

The by-pass resistance around the meter has a sufficiently high resistance not to affect the meter, but at the same time low enough not to affect the extinguishing circuit should the meter fail electrically or mechanically.

At the same time the maximum current is set so that the pointer cannot read beyond full scale.

The meter M may be calibrated to indicate the condition of the anode supply such as the self-contained battery element E which will be in the upper part of the handle.

Now referring specifically to the circuit of FIGS. 1 and 2, the point 10 is at the top of the test stick and may be applied to the source of high voltage to be tested.

The series resistances $R_1$ lead to the junction point 11, from whence the line 14 leads to the grid or starter element 15 of the thyratron tube 16.

The cathode side 17 of the thyratron tube 16 is positioned at the side of the anode connection 18.

The cathode side 17 of the thyratron tube 16 is connected by the line 19 to the negative side circuit 13, which connects at one side at a junction to the lower side of the resistance $R_v$ and at the other end to the negative battery source 22.

The positive side 21 of the battery is connected to the resistor $R_5$ and to the condenser $C_1$. The other side of the condenser $C_1$ and resistance $R_5$ is connected to anode 18 through the line 20.

The switch $SW_2$ has the junction points 27 and 32 respectively and the contact legs 28 and 29.

These contact legs will either establish circuits with the contacts 26 and 35 in normal position or the contacts 25 and 31 in the check position.

The junction point 32 is connected to the line 13 through the capacitor $C_3$ and through the resistance $R_6$ and the line 33. This connection has the function of charging condenser $C_3$ when switch $SW_2$ is in normal position.

The junction point 27 on the other hand is connected by the line 37 to the line 13.

Between the line 13 and the line 14 at the left of the circuit of FIG. 1 will be a connection through the resistance $R_4$ and the switch $SW_1$ having the junction point 38 and the contact 36. This serves as a sensitivity control.

In normal position, the contact 35 is connected through the line 39 to the positive connection 20a.

The contact 26 on the other hand in normal position is connected through the line 34 to a junction point on the line 35a between the resistances $R_3$ and $R_7$.

The resistances $R_3$ and $R_7$ in series with $R_6$ when in check position are used to pass voltage from charged condenser $C_3$ to the grid 15, thus firing the thyratron 16.

At the same time, the switch $SW_2$ when thrown to check position will disconnect resistor $R_3$ from the common leg 13, thus removing the resistance $R_3$ from the grid circuit.

The resistance $R_3$ extends to the line 14, while the two resistors $R_7$ connect to the junction point 31.

The contact 25 on the other hand leads to the anode 18 of the thyratron tube 16 through the line 24 and past the shunt connection of the resistor $R_8$ and the capacitor $C_2$, which in turn are connected to the line 23 leading to the anode of the thyratron.

The cold cathode thyratron tube 16 acts as an amplifying means, a relaying means and also as a light indicating device.

When the thyratron tube 16 is acting as a relaying device, it will cause a meter indication on the meter M and also give necessary alarm indications. The tube 16 will also act as a light indicating device regardless of the external circuit. The tube 16 will thus illuminate regardless of its external circuit and even if the meter M which is connected in series with the anode circuit becomes open circuited, short circuited or mechanically defective.

In FIG. 2, the only variation is that meter M with its shunting resistor $R_m$ is connected in series with the resister $R_5$ of the extinguishing circuit. At the same time condenser $C_1$ is so connected as to include the meter M in the circuit. The condenser $C_1$ is thus connected across the meter M and resister $R_5$.

Particularly referring to FIGS. 1 and 2, the safety by-pass $R_v$ may limit the voltage to a maximum of about 150 volts and the switch $SW_1$ may serve as a desensitizing switch.

The resistances $R_1$ are normally received in an elongated test stick with the handle member being positioned at 87 and the capacity effect of said handle member being more fully shown in FIG. 3 with its associated extensions.

The capacitor $C_4$ and the resistance $R_3$ comprises the calibration means for both A.C. and D.C. The capacitor $C_4$ is directly connected between lines 13 and 14 and resistance $R_3$ is connected to line 13 through switch $SW_2$ in normal position.

The potential at 21–22 is usually a battery or D.C. source which may be mounted in the handle of FIG. 3, and this battery may be rated at 150 volts, with the positive side of the battery leading to the extinguishing circuit $R_5$ and $C_1$ in FIG. 1 or $C_1$ and $R_5$ together with the meter M and the by-pass resistance $R_m$ in FIG. 2.

The circuit in the handle member F will be connected to the lower end of the resistance $R_v$ and to the line 13. This capacitor structure of the handle is best shown in FIG. 3.

The circuit in the handle member F has an outer insulating plastic sleeve which may be molded of Bakelite 60 to which may be attached by extension sleeve 61 one or more additional sections 62. These sections are of insulating tubing and may be provided with a metallic lining 68. The plate 63 will serve as the support for or base of the housing for the electronic equipment including the circuitry of FIGS. 1 and 2. The metallic lining 68 may be extended to any desired length or made in sections like the plastic outer tube 62. The metallic sleeve or lining 68 is of the same material as the sleeve or lining 64 around the battery E. The battery E is connected at the terminals 21 and 22 of FIGS. 1 and 2.

As shown in FIG. 3, the battery E will be enclosed in the innermost aluminum sleeve 64 and will be held in position by the cap 65 having an adjustable screw connection 66 to the head 67 of the metal cylinder 68 which may be made of aluminum of about $\frac{1}{16}''$ in wall thickness.

The cap 67 is desirably made of a solid piece of aluminum, and it will close off the head of the sleeve 68.

The screw 66 is connected to the cap member 65, and it will extend as indicated at 69 to establish contact with the lower end 70 of the battery E.

The sleeve may carry the intermediate disc or shelf member 71 as a hand guard and each section 62 also may be provided with such a shelf or hand guard attachment as indicated at 72.

The aluminum sleeve portion 68 is desirably cemented into the sleeves or extensions 60 and 62 by means of a plastic cement or epoxy resin, and as many sleeves 62 and cylinders 68 may be employed connected together to give the desired capacitor effect which will replace the ground.

These tubular insulating extensions 60 and 62 with the metal liners 68 which form the capacity may extend as long as desired to give a suitable length and protection to the device.

In lieu of aluminum sleeves 68, it is possible to use copper clad plastic or Bakelite tubing or metal clad insulating tubing. It is obvious that the metal liners 68 may be made integral with the plastic tube 62.

The device as shown is fully effective without a ground connection. This tubular handle construction with the outer Bakelite sleeve and the inside aluminum sleeve or the metal clad sleeves as shown best in FIG. 3 will most effectively serve as a potential indicating device without ground connections, and they are much superior to neon tube devices which operate on the principle of a capacity coupled device coupled to a neon tube and necessarily having a high resistance leakage to the ground.

The longer the extension handle F, of FIG. 3, the higher the sensitivity of the test stick. The extension handle as shown in FIG. 3 will have increased capacity to earth as it is lengthened, and the metallic sleeves are insulated externally by the plastic sleeves although they are connected to the cathode of the thyratron tube at 22.

The capacity arrangement in the handle may be widely varied by change in length and diameter of the cylinders 60, 62 and 68, and it is so designed that it provides means of coupling the ungrounded cathode and its connection to the voltage divider to the earth, thus providing in effect a capacity coupling from said circuit to the earth.

Furthermore, with the addition of extension handles causing the ungrounded cathode to be moved further from the earth, the reduction in sensitivity is automatically offset by the increased length of the earth coupling capacitors, which in effect result in an increase of capacity coupling. In other words, the cathode 17 which is connected to the negative side of the battery E may have a variable capacity in respect to ground through the handle F depending upon diameter and length of the tubes 60, 62 and 68.

The device of the present application is particularly suitable in enabling the utilization of extension handles permitting the operator's vision to be directed skyward and with the electrical meter M being placed in series with the thyratron tube 16 as previously described.

The present invention eliminates one of the chief objections to ungrounded test sticks in that they lack self-contained means of automatically checking the operation of the potential detector before and after usage.

It eliminates the necessity of utilizing portable battery buzzers or automobile induction coils or high voltage test plates which are utilized with other so-called portable test sticks.

Figure 4:
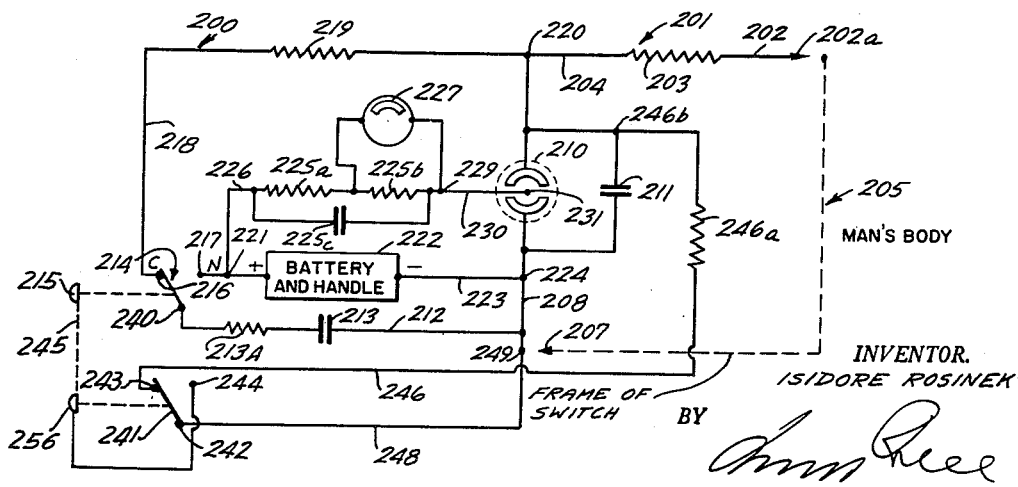
FIG. 4 is a diagrammatic circuit indicating the method of checking the test stick without the use of the ground.

FIG. 4 shows a modification of the check circuit used in FIGS. 1 and 2, which may be utilized without the voltage divider.

The method shown in FIG. 4 is very practical, allowing the operator rapidly to check the device without loss of time. The circuit of FIG. 4 is substantially identical with that of FIGS. 1 and 2 except that the meter 227 is shown in parallel with a resistance 225d and a capacity 225c at the other side of the tube 210.

In order to provide a checking means similar to that described in my application, Serial No. 431,215, filed May 20, 1954, now Patent No. 2,988,700, it is necessary to provide a connection between the cathode and the high voltage probe. A specially constructed check switch is provided wherein when the operator presses the switch button with his bare hand (finger), he automatically makes connection with his body and the cathode circuit.

With this arrangement, if the tester applies one bare finger to the check switch button and the other bare hand to the probe end of the high voltage test stick, he will automatically check the device.

When the check button is pressed, the electronic portion of the circuit and the condition of the battery or D.C. anode source are automatically checked.

The device is so constructed that it will be impossible for the operator physically to contact said button and test probe of the device except when the device has been lowered away from any conductor or circuit and is in close proximity to his body.

The completion of the circuit from the cathode via the tester's body to the test probe will automatically prove the continuity of the high voltage resistors.

This circuit is best shown in FIG. 4.

In FIG. 4, there is shown a check circuit 200 and a high voltage circuit 201. The cathode circuit is provided with the test probe 202 serving and functioning the same as the elongated element $R_1$, FIGS. 1 and 2, which element $R_1$ is connected to the grid of the tube 16 as is also the element 201 of FIG. 4. It is noted that the resistance element $R_1$ of FIGS. 1 and 2 and the resistance element 203 of FIG. 4 are both connected to the same element of the tubes 16 and 210, respectively.

The body of the operator indicated by the dotted line 205 acting as comparative low resistance indicated by the dotted line circuit 205 has a connection at 207 to the line 208. In FIG. 4 the lead 202 may be considered as connected to the series of resistances indicated $R_1$ in FIGS. 1 and 2 with the point 11 of FIGS. 1 and 2 being in the same position as 202a of FIG. 4.

Between line 204 and the line 208 is positioned the thyratron tube 210 in parallel with the condenser 211.

The check circuit 200 has the line 212 leading to the charged condenser 213 and the limiting resister 213a which is in series with the check switch 214 having the press button 215 and the check and manual terminal C and N. Connected to the terminal 216 are the lines 218 and the resistor 219 leading to the junction 220 with the test probe 202 at the other side of the resistance 203.

The terminal 217 is connected through a junction 221 to the D.C. battery source 222 which is located at E in the handle which at its other side has a negative connection at 223 to the junction 224 on the line 208. The diagram in FIG. 4 shows how the battery E is connected in the circuits of FIGS. 1 and 2 with the terminals 21 and 22 being on opposite sides of the battery 222.

The extinguishing network consists of resistance 225a in series with the meter 227 by-passed by resistance 225b shunted by condenser 225c. This extinguishing circuit is positioned between line 226 and junction 229. Junction 229 is connected by line 230 to anode 231.

The switch 214 is desirably of the double pole type, and it has an upper leg 240 and a lower leg 241.

The upper leg 214 swings between the manual and check contacts C and N, while the lower leg 241 has a junction point or pivot point 242, and it swings between the contact points 243 and 244.

In respect to the leg 241, the check contact 243, will be connected through the line 246 and the calibrating resistance 246a to the junction 246b which is connected to the grid or starter element of the thyratron tube 210.

The other contact 244 in normal position is connected to the metallic button 256 of the switch. The arm 241 at pivot point 242 is connected by the line 248 to junction point 249.

The two legs are connected mechanically as indicated by the dotted line 245.

The handle or button members 215 and 256 are connected together so as to swing both legs 240 and 241 at the same time and are electrically insulated from said legs 240 and 241.

Then while the bare finger is pressing button 256, the operator will touch the probe 202a at end of line 202 with his other bare hand. His body 205 acts as a comparative low resistance conductor between the end of the probe and the cathode 231 of the thyratron 210.

This causes the thyratron 210 to cease firing which will result in meter 227 going to zero and the thyratron 210 to cease lighting showing that the resistance 203 is intact and functioning.

If the operator should break contact between the probe 202a and the button 256 while pressing the button 256, the thyratron 210 will pulse or light and the meter 227 will show an indication.

The meter M of FIG. 2 together with the meter shunt $R_m$ may also be applied to the circuit of FIG. 1 which is without ground.

In operation, the thyratron tube 210 is a cold cathode type which is always ready for instantaneous use but consumes no current while not in use. It carries its own power supply in the form of the battery 222 which is positioned in the handle at E as shown in FIG. 3. This small battery 222 makes the device a truly portable device and enables it to be both self-testing and "fail safe," and even indicates automatically when the battery requires replacement.

The thyratron tube 210 gives a light indication while the meter 227 will give a full scale meter indication for all A.C. or D.C. voltages within its voltage range and barring breakage will last almost indefinitely with its battery requiring only yearly shelf-life replacement.

In FIG. 4 the checking circuit 200 is added to the basic circuit as shown in FIGS. 1 and 2. This self-contained checking circuit makes possible the use of a low voltage battery for both checking and operation of the test stick with the battery 222 serving this function.

It will be particularly noted that the device is so constructed that it will be impossible for the operator physically to contact said button and test probe of the device except when the device has been lowered away from any "live" contact or circuit.

When the checking button is pressed, the electronic portion of the circuit is checked, as is also the condition of the anode battery 222.

If while these indications are being received the operator contacts the test probe of the device with his bare other hand, the indications will be interrupted and will be restored again upon removal of his hand from the test probe.

This will prove the continuity of the high voltage resistor circuit.

This provides a built-in check method and eliminates the necessity of additonal external checking devices, such as, buzzers and the like.

Due to the very high resistance of the internal check circuit, the operator will suffer no shock.

In the present invention, since the D.C. operated thyratron, when fired remains fired, an important feature resides in the provision for extinguishing said thyratron.

This extinguishing circuit should not consume any power while the test stick is not being used. Furthermore, it will be automatic in its operation and ready for instantaneous use.

Furthermore, it must not affect the transition current required for the transfer of the minute arc produced between the cathode and the anode.

Since the calibration of the indicating device depends entirely upon the amount of starting current consumed, for a given voltage applied to the end of the test stick, it is essential that the transition current required will not vary and thus affect the calibration of the testing device.

To start with, if the small internal anode-cathode capacity of the tube is connected in series with a relatively large external capacitor, the two capacities will be in series across the anode D.C. supply.

Since the internal capacity is small and the external capacity is large, practically full voltage will be developed across the anode-cathode terminals of the tube.

Now if the cathode circuit be fired, the arc will be transferred to the anode-cathode circuit, with the cathode illumination being that produced by the charging current of the external condenser.

Since the tube passes current in only one direction, the anode current ceases as soon as the condenser is charged.

The tube cannot be fired again until the external condenser or capacitor is discharged.

If a high resistance is connected across the high external condenser, this will cause the external condenser to discharge in the reverse direction.

At the same time, the voltage across the internal anode cathode capacity will build up rapidly until ultimately its anode voltage will be sufficiently high to allow the transition to take place for the given starter anode current.

Thus the calibration of the potential device is maintained, since for a given starter cathode current there is a definite value of anode voltage necessary for the arc to transfer from the starter-cathode to the anode-cathode. The tube 16 of FIGS. 1 and 2 and 210 of FIG. 4 are started by the discharge from the condenser 213 of FIG. 4 and $C_3$ of FIGS. 1 and 2.

The extinguishing on the other hand is caused by the operator's body extending across the connection 202 and the line 208 whereupon the meter M of FIG. 2 and 227 of FIG. 4 will both show zero. This happens when the button 256 is closed. When the button 256 is open, the meter 227 will then be actuated. In other words, the body connection 205 of FIG. 4 extends across the connection or point 11 of FIGS. 1 and 2 and the leads 19 and 33 of FIGS. 1 and 2.

The extinguishing circuit consists of the parallel connections in the line 20 of FIG. 1, 20a of FIG. 2 and 226 of FIG. 4 and when they are connected with the anode 18 or 231, they will extinguish the tube.

For example, with the thyratron tube used, a minimum voltage calibration causing five micro-amperes to be impressed upon the starter cathode circuit would require a voltage in excess of 110 volts on the anode circuit before such arc would be transferred.

As proof thereof, if a resistor alone in the anode circuit be utilized, the calibration is not long maintained and illumination for such cathode is negligible.

At the same time the pulsing of the anode-cathode circuit will cease and the tube will hang up or remain lit, even at the low value of micro-amperes in such anode-cathode circuit.

The values of the condenser and resistance are very definite for a given pulsing frequency in any given tube.

The amount of illumination obtained depends on the capacity of the external condenser, while the combination resistance-capacity determines the time constant of the extinguishing circuit.

For a given tube, there is a definite value of capacity and in turn a slightly variable resistance.

And for repeated pulses at the same voltage calibration, it will require that the anode voltage be returned to the same value for each pulse.

It is thus apparent that the applicant has provided a reliable, portable, functioning high voltage test stick.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A portable high voltage test stick having a lower handle and upper extension, said upper extension serving to contact an elevated outdoor high tension line and including a series of resistances in series with an ungrounded lower circuit connection and said lower handle including a battery with positive and negative connections and an elongated plastic cylinder and a metal cylinder liner for said plastic cylinder forming a capacitor, a circuit connection between the negative side of said battery and said liner and circuitry between the ungrounded connection and the positive and negative connections of the battery, an intermediate carrier on said stick between said upper extension and said lower handle for said circuitry, said circuitry including a thyratron tube having a grid, anode and cathode, and an extinguishing circuit including parallel connected resistance, capacity and indicating meter elements, circuit connections from the lower connection to the grid, and from the positive connection to one side of the extinguishing circuit and from the other side of the extinguishing circuit to the anode, and a connection from the negative connection of the D.C. battery to the cathode.

2. The stick of claim 1, a sub-circuit including a capacity and a resistance in series also connected to the cathode at one side and alternative connections at the other side to the lower connection and to the positive connection and a switch to connect said alternative connections to said sub-circuit.

3. The stick of claim 1, a by-pass high resistance around said meter of such high resistance as not to substantially affect the meter indication and of such low resistance as to maintain the extinguishing circuit operative should the meter fail; said by-pass resistance serving to assure operation of the thyratron when the meter is not operating.

4. The stick of claim 1, said meter having a swinging indicator needle to indicate voltage and said capacity element having a slow discharge to dampen the meter.

5. The stick of claim 1, sub-circuits including a first sub-circuit having a single resistance connected to the lower connection at one side and a control switch in series therewith and an alternative second sub-circuit including a resistance leading to the grid at one side and a third sub-circuit leading to the anode at one side and a switch alternatively to connect the other sides of the first and second and the first and third sub-circuits to one another.

References Cited by the Examiner
UNITED STATES PATENTS

| | | | |
|---|---|---|---|
| 1,684,768 | 9/28 | Iler | 324—51 |
| 1,867,901 | 7/32 | Walter | 324—122 X |
| 1,867,944 | 7/32 | Nijland | 324—72.5 |
| 1,906,644 | 5/33 | Sleeper | 324—122 X |
| 1,744,840 | 1/40 | Strieby et al. | 324—122 X |
| 2,632,785 | 3/53 | Knoop et al. | 324—122 |
| 2,988,700 | 6/61 | Rosinek | 324—122 |

FOREIGN PATENTS 646,692  11/50  Great Britain.

WALTER L. CARLSON, *Primary Examiner.*
BENNETT G. MILLER, *Examiner.*